US008503333B2

(12) United States Patent
Östrup et al.

(10) Patent No.: US 8,503,333 B2
(45) Date of Patent: Aug. 6, 2013

(54) REESTABLISHMENT OF AN INTERFACE BETWEEN NODES IN A NETWORK USING A BACKOFF TIME

(75) Inventors: Nils Peter Östrup, Linköping (SE); Björn Abrahamsson, Linköping (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 163 days.

(21) Appl. No.: 13/059,833

(22) PCT Filed: Aug. 21, 2008

(86) PCT No.: PCT/SE2008/050942
§ 371 (c)(1),
(2), (4) Date: Feb. 18, 2011

(87) PCT Pub. No.: WO2010/021576
PCT Pub. Date: Feb. 25, 2010

(65) Prior Publication Data
US 2011/0141946 A1    Jun. 16, 2011

(51) Int. Cl.
*H04L 12/28* (2006.01)
(52) U.S. Cl.
USPC ............................. 370/254; 370/338; 455/436
(58) Field of Classification Search
USPC ................................... 370/254, 338; 455/436
See application file for complete search history.

(56) References Cited

U.S. PATENT DOCUMENTS 5,369,767 A * 11/1994 Dinwiddie et al. ........... 710/264
5,982,757 A    11/1999 Curtis et al.
8,265,046 B2 * 9/2012 Kuokkanen .................. 370/338
2007/0086350 A1 * 4/2007 Haberkorn et al. ........... 370/242
2007/0224978 A1    9/2007 Wherry et al.
2010/0260099 A1 * 10/2010 Frost et al. .................... 370/328
2011/0039517 A1    2/2011 Wigren et al.

FOREIGN PATENT DOCUMENTS

| EP | 1821454 A1 | 8/2007 |
| EP | 1833220 A1 | 9/2007 |
| JP | 2001-510968 | 8/2001 |
| WO | WO 2004/100403 A1 | 11/2004 |

OTHER PUBLICATIONS

"Universal Mobile Telecommunications System (UMTS); Evolved Universal Terrestrial Radio Access (E-UTRA) and Evolved Universal Terrestrial Radio Access (E-UTRAN); Overall Description; Stage 2 (3GPP TS 36.300 version 8.5.0 Release 8); ETSI TS 136 300" ETSI Standard, European Telecommunications Standards Institute (ETSI) vol. 3-R2 No. V8.5.0 Jul. 1, 2008.
International Search Report for corresponding application PCT/SE2008/050942 mailed Jun. 18, 2009.
"EnodeB",—Wikipedia, the free encyclopedia http://en.wikipedia.org/wiki/EnodeB , retrieved on Nov. 21, 2012; 2 pages.

(Continued)

Primary Examiner — Wei Zhao
(74) Attorney, Agent, or Firm — Myers Bigel Sibley & Sajovec, P.A.

(57) ABSTRACT

Methods of initializing an association between a first node and a second node include detecting an event indicating that the first node should establish an association with the second node. After detecting the event, the methods include waiting at least a certain amount of time before attempting to establish the association, and attempting to establish the association between the second node and the first node only after waiting the certain amount of time.

24 Claims, 6 Drawing Sheets

OTHER PUBLICATIONS

3rd Generation Partnership Project; ETSI TS 133 320 v10.5.0 (Jul. 2012) "Universal Mobile Telecommunications System (UMTS)"; LTE; Security of Home Node B (HNB)/Home Evolved Node B (HeNB); Technical Specification; (3GPP TS 33.320 version 10.5.0 Release 10) p. 37 pages.

Office Action for corresponding Japanese Patent Application No. 2011-523769 mailed Dec. 7, 2012, 2 pages, no translation.
Motorola, "Load Balancing & Overload Control concepts for the S1 interface", R3-080603, 3GPP, Apr. 3, 2008, 4 pages.

* cited by examiner

US 8,503,333 B2

REESTABLISHMENT OF AN INTERFACE BETWEEN NODES IN A NETWORK USING A BACKOFF TIME

CROSS REFERENCE TO RELATED APPLICATION

This application is a 35 U.S.C. §371 national stage application of PCT International Application No. PCT/SE2008/050942 filed on 21 Aug. 2008, the disclosure and content of which are incorporated by reference herein in its entirety. The above-referenced PCT International Application was published in the English language as International Publication No. WO 2010/021576 A1 on 25 Feb. 2010.

TECHNICAL FIELD

The present invention relates to systems and methods for reducing signaling load in a network.

BACKGROUND

As defined in the 3rd Generation Partnership Project (3GPP) specification, an S1 interface can serve as an interface between an eNodeB and a mobility management entity (MME) in an E-UTRAN system. Generally, the eNodeB must initialize a protocol layer between the MME and the eNodeB by sending an S1 setup request message to the MME. Before the S1 setup request message is sent, however, a Stream Control Transmission Protocol (SCTP) protocol is initialized by the eNodeB through the establishment of an SCTP Association (a transport network layer (TNL) association) between the nodes. In this way, many eNodeBs (e.g., on the order of thousands) can connect to a single MME. In normal operation, each eNodeB will attempt to connect to the MME at a different time.

A problem can arise when an already-established interface between the eNodeBs and an MME becomes interrupted. This can happen for a variety of reasons, including hardware or software failure at the MME, unexpected loss of power, etc. When the interruption occurs, all of the eNodeBs previously connected to the MME will attempt to re-establish the interface. This can result in excessive signaling load, which has a detrimental impact on network performance.

Thus, there exists a need for a method and system for reducing signaling load when, for example, an interruption occurs.

SUMMARY

According to one aspect of the present invention, a method of initializing an association between a first node and a second node is provided. In one embodiment, the method includes the following steps. First, an event indicating that the first node should establish an association with the second node is detected. After detecting the event, the first node waits at least a certain amount of time before attempting to establish the association with the second node (the certain amount of time may be randomly selected by the first node or second node or pre-configured). Finally, after waiting the certain amount of time, the first node may attempt to establish the association between the second node and the first node. The step of attempting to establish the association may include transmitting a message from the first node to the second node.

In some embodiments, the method also includes receiving at the first node a message (e.g., a setup response message transmitted in response to a setup request message) transmitted from the second node prior to detecting the event, wherein the message transmitted from the second node comprises information specifying the certain amount of time. While in other embodiments, the method also includes receiving at the first node a message transmitted from the second node prior to detecting the event, wherein the message transmitted from the second node comprises information identifying a first amount of time and a second amount time, wherein the first amount time and the second amount of time are used to define a window of time and the step of attempting to establish the association occurs only during the defined window of time. The first node may randomly select a time within the defined window of time, wherein the step of attempting to establish the association occurs at the randomly selected time.

In some embodiments, the step of waiting at least the certain amount of time comprises waiting not more than a second amount of time and the step of attempting to establish the association occurs prior to the expiration of the second amount of time. In these embodiments, the method may further include randomly selecting an amount of time that is between the certain amount of time and the second amount of time and the step of attempting to establish the association occurs at the expiration of the randomly selected amount of time.

In some embodiments, the first node may not wait any amount of time at all to establish the association. For example, in cases where a failure in the link was due to reasons located in the first node, the first node may attempt to re-establish the association immediately after detecting the failure.

In some embodiments, the first node is a base station (e.g., an eNodeB), the second node is a mobility management entity (MME), and the association is a transport network layer association.

Another aspect of the present invention provides a method for a network node to provide to a base station information identifying the least amount of time the base station should wait before attempting to re-establish a connection with the network node. In some embodiments, the method includes: receiving at the network node a setup request message transmitted from the base station; in response to the setup request message, generating a setup response message, wherein the step of generating the setup response message includes including in the setup response message information identifying a wait time; and transmitting the setup response message to the base station. The wait time may be randomly selected prior to including the information identifying the wait time in the response message. Alternatively, the wait time may be determined based, at least in part, on the number of setup requests that have been received (e.g., from all base stations in the network) in a time interval before a specific setup request message was received by the network node.

In some embodiments, the wait time is a minimum wait time and the step of generating the setup response message further includes including in the setup response message information identifying a maximum wait time, wherein the minimum wait time and the maximum wait time define a time window.

In some embodiments, the base station, after receiving the setup response message and detecting a break in a connection between the base station and the network node, waits a certain amount of time before attempting to establish a new connection between the network node and the base station, wherein the certain amount of time is within the time window. The base station may randomly select the certain amount of .

In some embodiments, the method also includes: receiving at the network node a second setup request message transmitted from a second base station; in response to the second setup request message, generating a second setup response message, wherein the step of generating the second setup response message includes including in the second setup response message information identifying a second wait time; and transmitting the second setup response message to the second base station, wherein the second set up request message is received after the first set up request message is received, and the second wait time is greater than the first wait time.

Another aspect of the invention provides an improved network node. In some embodiments, the network nodes includes: a processor; a transmitter for transmitting data to a base station; a receiver for receiving data transmitted by the base station; and a data storage device containing computer instructions, the computer instructions comprising: instructions for processing a setup request message transmitted from the base station; instructions for generating a setup response message, the instructions including instructions for including in the setup response message information identifying a wait time; and instructions for using the transmitter to transmit the setup response message to the base station.

Another aspect of the invention provides an improved base station. In some embodiments, the base station includes: a processor; a transmitter for transmitting data to a network node; a receiver for receiving data transmitted by the network node; and a data storage device containing computer instructions, the computer instructions comprising: instructions for waiting at least a certain amount of time before attempting to establish a connection with the network node; and instructions for attempting to establish the connection.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

In some embodiments, the present invention relates to systems and methods for re-establishing an interrupted connection between nodes in a wireless network. More particularly, the present invention relates to systems and methods for re-establishing the connection in such a way to avoid an excessive signaling load.

Figure 1:
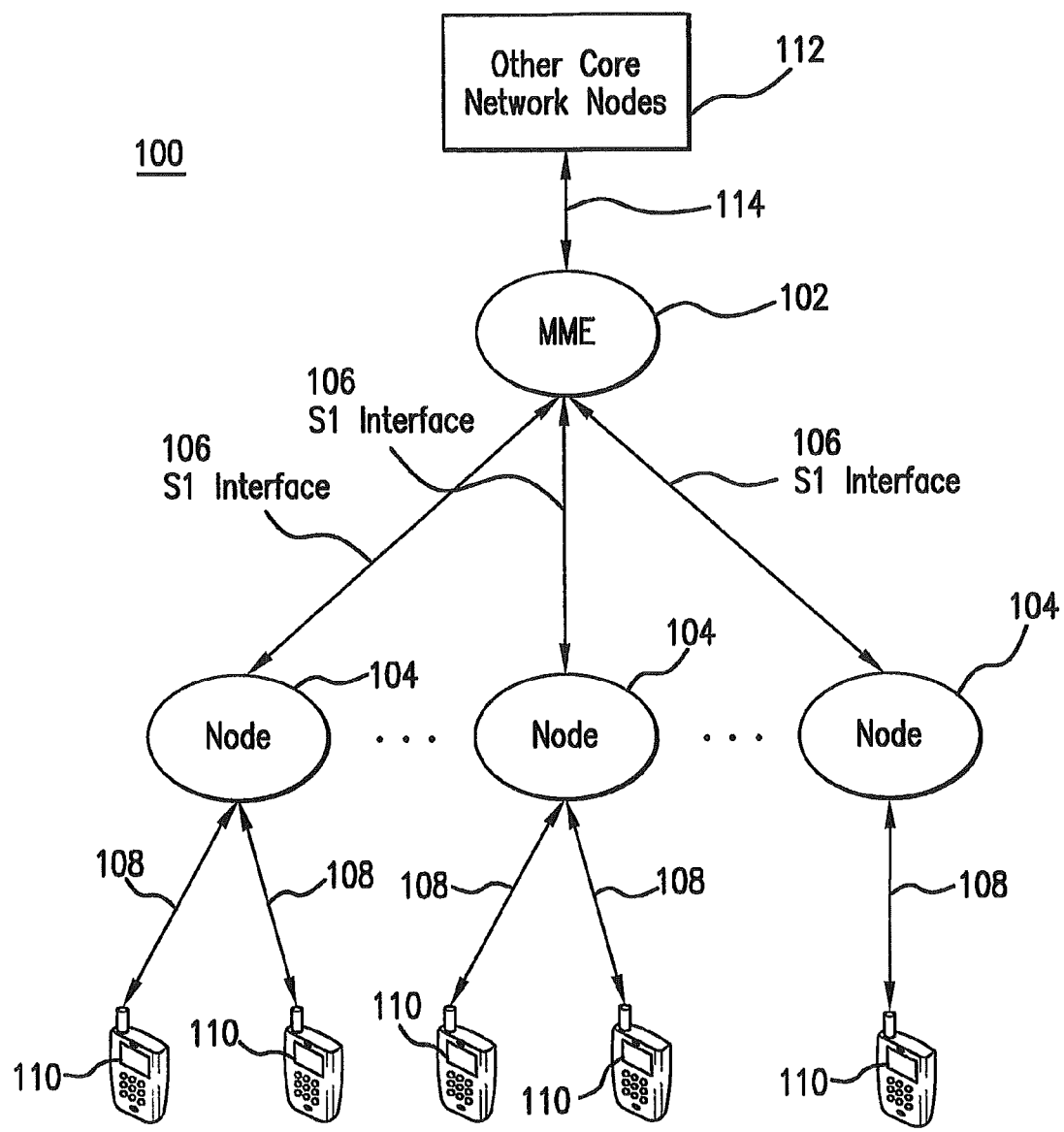
FIG. 1 functionally depicts a wireless communication network according to embodiments of the present invention.

FIG. 1 shows an exemplary wireless network 100 according to embodiments of the present invention. The network comprises a plurality of user equipments (UEs) 110 (a.k.a., "user devices 110") such as cellular telephones, laptops, PDAs, pagers or other UEs. The user devices 110 are each connected to a node 104 (e.g., a base station such as an eNodeB) via a user device interface 108. According to some embodiments of the present invention user device interface 108 can be a radio frequency (RF) interface.

Each node 104 may be connected to a node 102 (e.g., a mobility management entity (MME) or other like node) via an interface 106. According to some embodiments of the present invention, the interface 106 is an S1 interface. Each node 102 can have a large number of nodes 104 connected to it. For instance, some embodiments of the present invention have as many as 30,000 nodes 104 connected to each node 102. Node 102 may interface with other core network nodes 112 via core network interface 114.

Figure 2:
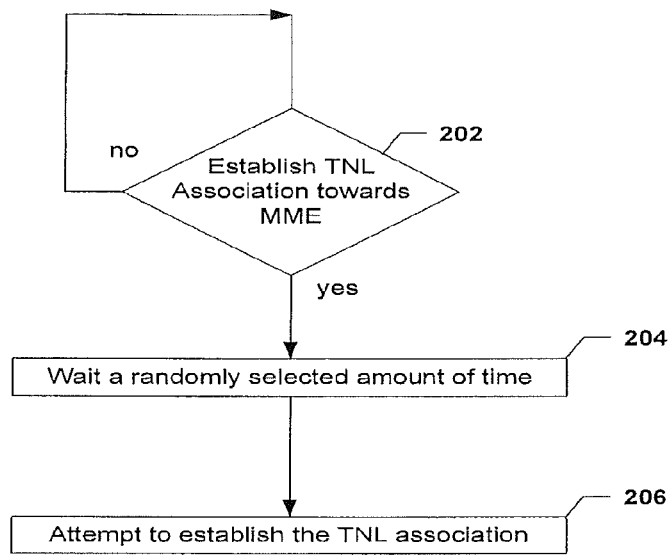
FIG. 2 is a flowchart showing a method of establishing a TNL association towards a mobility management entity according to an embodiment of the present invention.

From time to time interface 106 between node 102 and one or more nodes 104 can become interrupted by, for instance, power failure, software failure, or hardware failure or due to operation and maintenance. When this happens, each node 104 will need to re-establish the interface 106 between node 104 and node 102. FIG. 2 depicts a method 200 of re-establishing an interface according to one embodiment of the present invention.

Method 200 may begin at step 202, where node 104 determines whether it needs to establish an association (e.g., TNL association) towards node 102. If it does not need to (i.e., if the association already exists), then the method does nothing and loops back. If an association needs to be established, then node 104 waits a certain amount of time at step 204 before attempting to establish the association at step 206. For example, in step 204, node 104 may wait a pre-configured amount of time (e.g., an amount of time identified by a value stored in a storage device of node 104) or node 104 may randomly select a value (e.g., use a random number generator to generate a random value) and then wait an amount of time based on the value.

Figure 3:
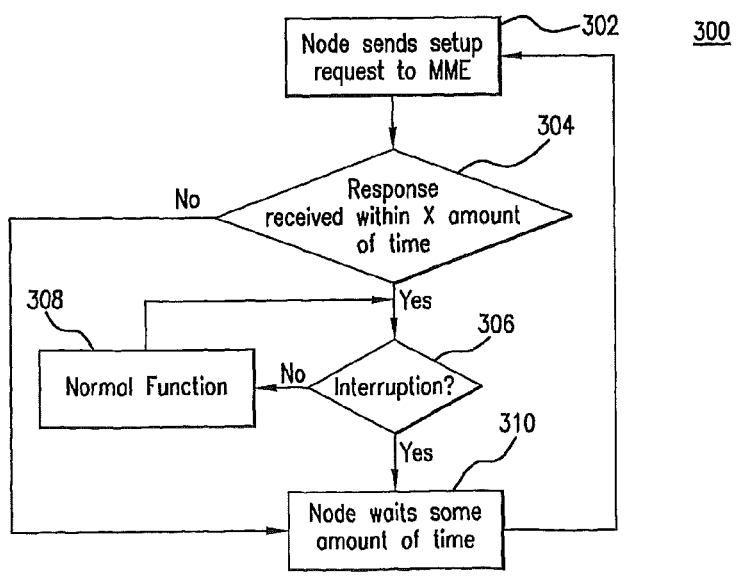
FIG. 3 is a flowchart depicting a method of establishing a connection between a node and a Mobility Management Entity after an interruption has occurred according to an embodiment of the present invention.

FIG. 3 is a flowchart depicting a method 300 of establishing an interface 106 between a node 104 and a node 102 as well as re-establishing the interface 106 if it becomes interrupted—according to embodiments of the present invention. According to method 300, at step 302, node 104 sends a setup request message to node 102. In step 304, a determination is made as to whether node 104 received from node 102 a response to the setup request message within X amount of time (e.g., 1 second or more or less) from when the setup request message was sent. If no response is received within the time limit, then process 300 proceeds to step 310, otherwise it proceeds to step 306. In response to the first setup request, node 102 should send a response to node 104. The response may include information (e.g., some value) identifying a wait time.

At step 306, node 104 determines whether an interruption in the interface 106 between node 104 and node 102 has occurred. If it has not, then the node functions normally at step 308. If, however, node 104 detects that an interruption has occurred, then, at step 310, node 104 waits a certain wait time (e.g., a pre-configured wait time or a wait time specified by node 102 in the response to the setup request). After node 104 has waited the wait time, process 300 may loop back to step 302, where node 104 sends another setup request message.

Figure 4:
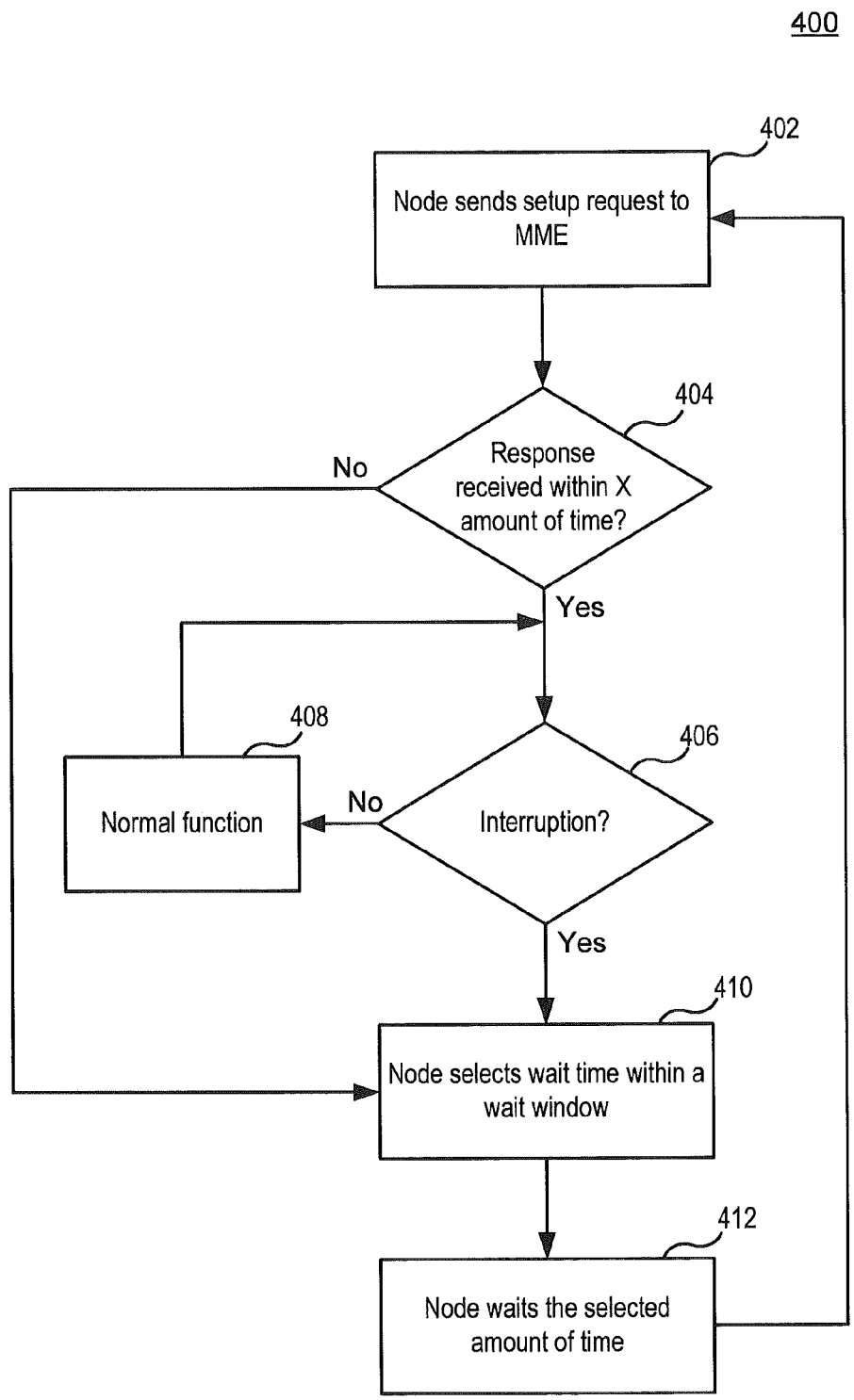
FIG. 4 is a flowchart depicting a method of re-establishing a connection between a node and a Mobility Management Entity when the connection has been interrupted according to an embodiment of the present invention.

FIG. 4 is a flowchart depicting a method 400 of establishing an interface 106 between a node 104 and a node 102 as well as re-establishing the interface 106 if it becomes interrupted according to embodiments of the present invention. At step 402, node 104 sends a setup request message to node 102.

In step 404, a determination is made as to whether node 104 received from node 102 a response to the setup request message within X amount of time (e.g., 1 second or more or less) from when the setup request message was sent. If no response is received within the time limit, then process 400 proceeds to step 410, otherwise it proceeds to step 406. In response to the first setup request, node 102 should send a response to node 104. The response may include information (e.g., some value or values) identifying a wait time window. For example, the response may include information identifying a minimum wait time and/or a maximum wait time.

At step 406, node 104 determines whether there is an interruption in the interface 106 between node 104 and node 102. If there is no interruption, then node 104 functions normally at step 408. If, however, node 104 detects an interruption, then at step 410 node 104 selects a wait time within a wait time window (e.g., a wait time window identified in the response message sent to node 104 or a pre-configured wait time window). In some embodiments, node 104 may randomly select a value that falls within the time window. For instance, if the wait time window is defined by information identifying a minimum wait time and a maximum wait time, then node 104 may generate a random number between the minimum wait time and the maximum wait time. Next, at step 412, node 104 waits the selected wait time (e.g., the selected wait time may be 3 seconds). Only after node 104 has waited the selected wait time does node 104 send another setup request to node 102.

Figure 5:
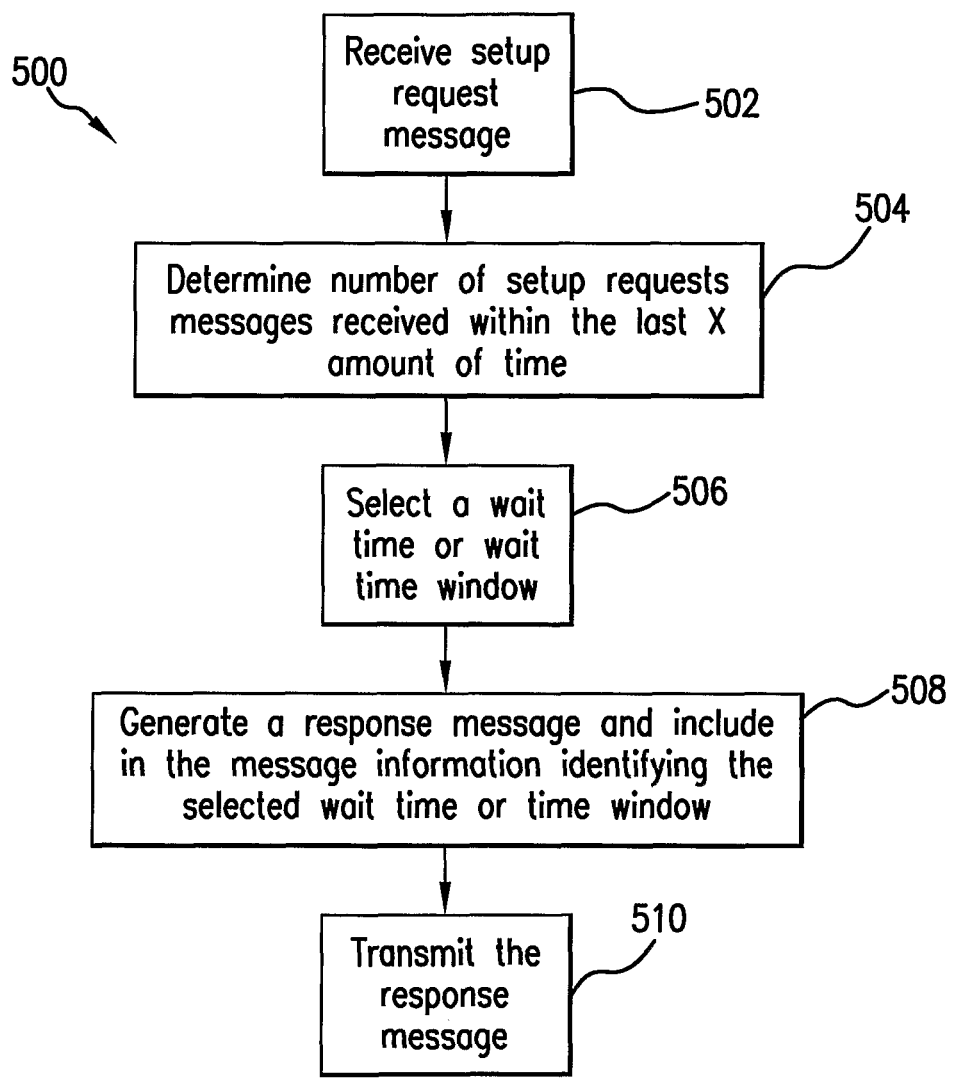
FIG. 5 is a flow chart illustrating a process according to an embodiment of the invention.

Referring now to FIG. 5, FIG. 5 is a flow chart illustrating a method 500 performed by a node 102 (e.g., an MME) according to an embodiment of the invention. Method 500 may begin in step 502, where node 102 receives a setup request message transmitted from a node 104. Next (step 504), node 102 determines the number of setup requests messages that it has received within the last X amount of time (e.g., within the last 5 minutes). Next (step 506), node 102 selects a wait time or a wait time window. The step of selecting a wait time or wait time window may include or consist of randomly selecting a wait time from a set of wait times, generating a random number and using this number to determine a wait time, and retrieving a wait time value from a storage device of the node (see e.g., storage device 606 in FIG. 6). Additionally, node 102 in performing step 506 may use the information determined in step 504 to select the wait time. For example, the selected wait time may be a function of the number of setup requests received such that the wait time increases or decreases as the number of setup requests increase. Thus, the node 102 could select a longer/shorter wait time in response to each subsequent setup request. Next (step 508), node 102 generates a response message and includes in the message information identifying the selected wait time or wait time window. Next (step 510), node 102 transmits the response message to the node 104 that transmitted the setup request message.

Figure 6:
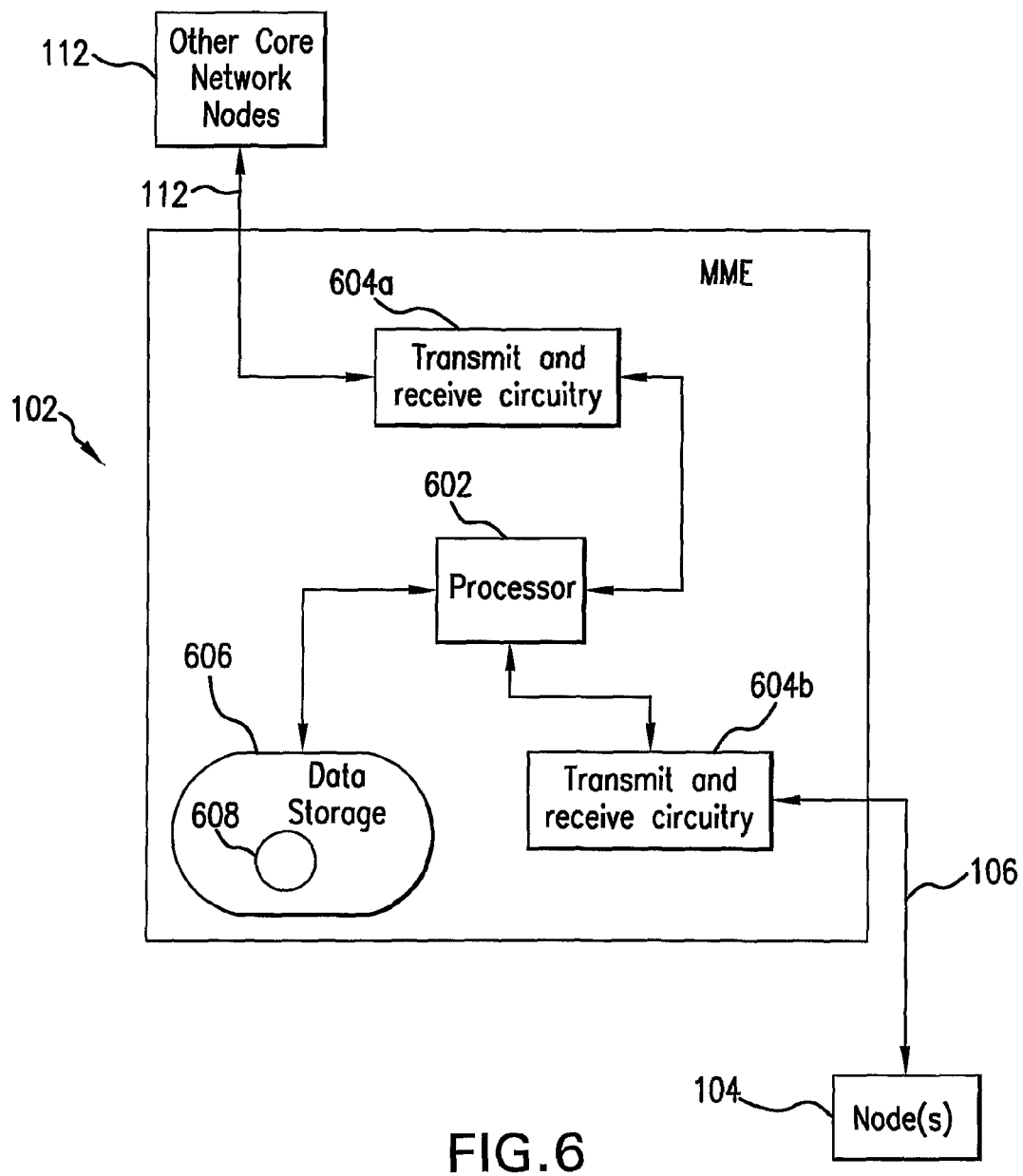
FIG. 6 is a functional block diagram of a Mobility Management Entity according to embodiments of the present invention.

Referring now to FIG. 6, FIG. 6 depicts a functional block diagram of an exemplary node 102 according to embodiments of the present invention. Node 102 may comprise a processor 602. The processor 602 communicates with transmit and receive circuitry 604a and 604b. Transmit and receive circuitry 604a can be configured to communicate with core network 112 via interface 114. Similarly, transmit and receive circuitry 604b can be configured to communicate with a plurality of nodes 104 via interface 106. While FIG. 6 shows node 102 having two separate transmit and receive circuits 604a and 604b, one of ordinary skill in the art would understand that one circuit could be used to perform the functions of both transmit and receive circuits 604a and 604b.

Node 102 may also include a data storage device 606 on which a plurality of computer instructions 608 (i.e., software) have been stored. Processor 602 can be configured to execute software 608 stored on the data storage device. Software 608 is configured such that when processor 602 executes software 608, node 102 performs steps described above with reference to the flow chart shown in FIG. 5. For example software 608 may include computer instructions for transmitting to a node 104 a response to a setup request received from the node 104, wherein the response includes information identifying a set wait time, which may be stored in storage device 606, or information identifying a minimum wait time and/or a maximum wait time, which also may be stored in storage device 606. Software 508 may also include computer instructions for selecting the wait time, which may include computer instructions for generating a random number or computer instructions for keeping track of the number of setup requests received in a given time interval and instructions for selecting a wait time based on this information.

Figure 7:
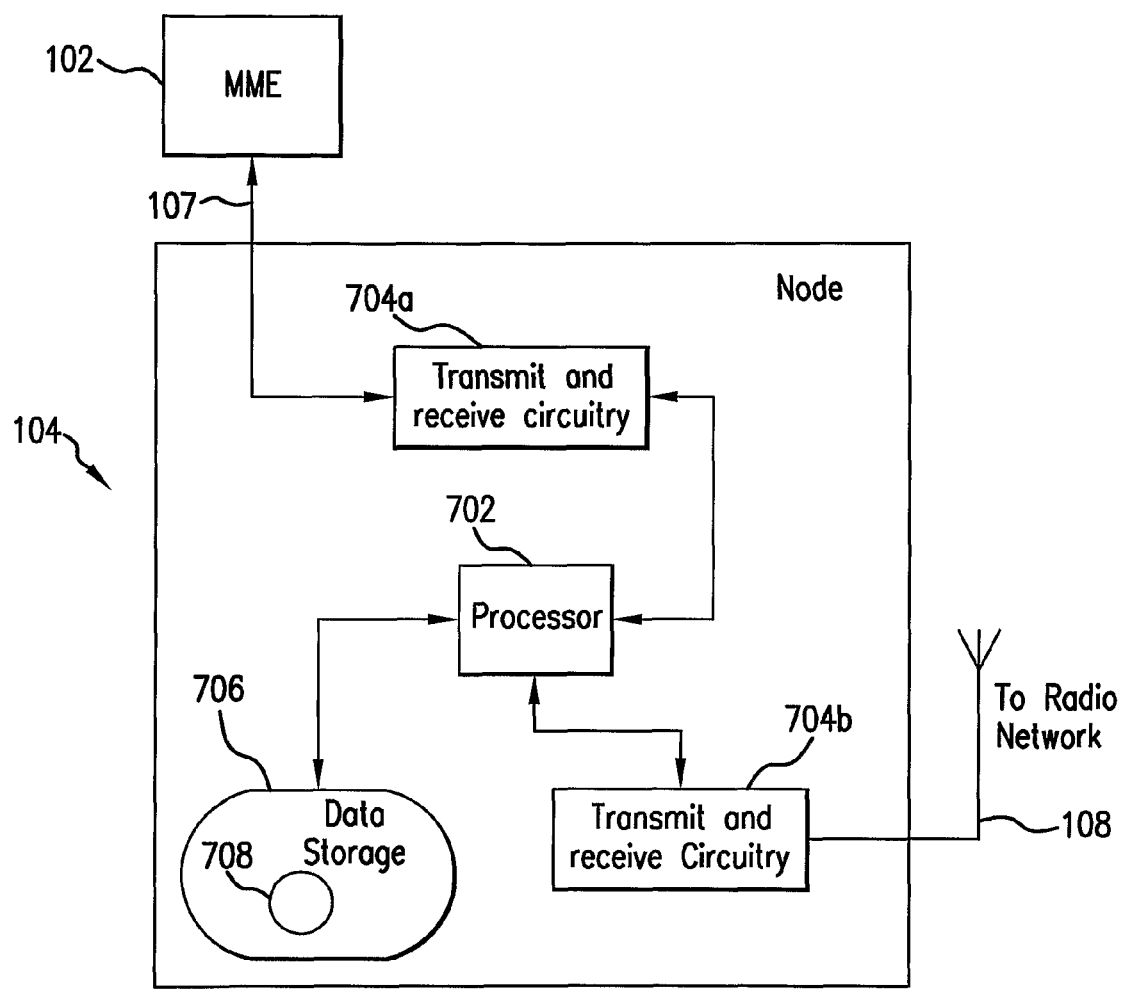
FIG. 7 is a functional block diagram of a network node according to embodiments of the present invention.

Referring now to FIG. 7, FIG. 7 depicts a functional block diagram of an exemplary node 104 according to embodiments of the present invention. Node 104 may comprise a processor 702. The processor 702 can be configured to communicate with the transmit and receive circuitry 704a and 704b. Transmit and receive circuitry 704a can be configured to communicate with node 102 via interface 106. Similarly, transmit and receive circuitry 704b can be configured to communicate with a plurality of user devices via interface 108. While FIG. 7 shows node 104 having two separate transmit and receive circuits 704a and 704b, one of ordinary skill in the art would understand that one circuit could be used to perform the functions of both transmit and receive circuits 704a and 704b.

Node 104 may also include a data storage device 706 storing software 708. Processor 702 can be configured to execute software 708. Software 708 is configured such that when processor 702 executes software 708, node 104 performs steps described above with reference to the flow charts shown in FIGS. 2-4. For example software 708 may include computer instructions for transmitting to a node 102 a setup request message; computer instructions for detecting an interruption in interface 106; computer instructions for retrieving from storage device 706 information identifying a wait time in response to the detection of an interruption; computer instructions for randomly selecting a wait time; and/or computer instructions for generating random values used in selecting a wait time.

While the processes described herein have been illustrated as a series or sequence of steps, the steps need not necessarily be performed in the order described, unless explicitly indicated otherwise.

Further, while various embodiments of the present invention have been described above, it should be understood that they have been presented by way of example only, and not limitation. Thus, the breadth and scope of the present invention should not be limited by any of the above-described exemplary embodiments.

What is claimed is;

1. A method of initializing an association between a first node and a second node, comprising:
   detecting an event indicating that the first node should establish the association with the second node;
   after detecting the event, waiting at least a certain amount of time before attempting to establish the association;
   attempting to establish the association between the second node and the first node only after waiting the certain amount of time, wherein attempting to establish the association comprises transmitting a message from the first node to the second node; and
   receiving at the first node a message transmitted from the second node prior to detecting the event, wherein the message transmitted from the second node comprises information identifying a first amount of time and a second amount time, wherein the first amount time and the second amount of time are used to define a window of time, and wherein attempting to establish the association occurs during the defined window of time.

2. The method of claim 1, wherein the certain amount of time is randomly selected by the first node.

3. The method of claim 1, further comprising randomly selecting a time within the defined window of time, wherein attempting to establish the association occurs at the randomly selected time.

4. The method of claim 1, wherein waiting at least the certain amount of time comprises waiting not more than a second amount of time, and the step of attempting to establish the association occurs prior to expiration of the second amount of time.

5. The method of claim 4, further comprising randomly selecting an amount of time that is between the certain amount of time and the second amount of time, wherein attempting to establish the association occurs at expiration of the randomly selected amount of time.

6. The method of claim 1, wherein the certain amount of time is randomly selected by the second node.

7. The method of claim 1, wherein the first node is a base station, the second node is a mobile management entity, and the association is a transport network layer association.

8. A method of establishing a connection between a network node and a base station, comprising:
   receiving at the network node a setup request message transmitted from the base station;
   in response to the setup request message, identifying a wait time that represents a least amount of time the base station should wait before attempting to establish the connection with the network node;
   generating a setup response message, wherein the generating the setup response message comprises including in the setup response message information identifying the wait time;
   transmitting the setup response message to the base station;
   wherein the wait time is a minimum wait time; and
   wherein generating the setup response message further comprises including in the setup response message information identifying a maximum wait time, wherein the minimum wait time and the maximum wait time define a time window.

9. The method of claim 8, further comprising randomly selecting the wait time prior to including the information identifying the wait time in the response message.

10. The method of claim 8, further comprising determining the wait time based, at least in part, on a number of setup requests that have been received in a time interval.

11. The method of claim 8, further comprising:
   after receiving the setup response message, detecting a break in the connection between the base station and the network node;
   after detecting the break, waiting a certain amount of time before attempting to establish a new connection between the network node and the base station, wherein the certain amount of time is within the time window; and
   attempting to establish the new connection between the second node and the first node only after waiting the certain amount of time.

12. The method of claim 11, wherein the base station randomly selects the certain amount of time.

13. The method of claim 10, further comprising:
   receiving at the network node a second setup request message transmitted from a second base station;
   in response to the second setup request message, generating a second setup response message, wherein generating the second setup response message comprises including in the second setup response message information identifying a second wait time; and
   transmitting the second setup response message to the second base station, wherein the second set up request message is received after the first set up request message is received, and the second wait time is greater than the first wait time.

14. A network node, comprising
   a processor;
   a transmitter coupled to the processor for transmitting data to a base station; and
   a receiver coupled to the processor for receiving data transmitted by the base station;
   wherein the processor is configured to process a setup request message transmitted from the base station; to identify a wait time that represents a least amount of time the base station should wait before attempting to establish a connection with the network node; to generate a setup response message including information identifying a minimum wait time and a maximum wait time, wherein the minimum wait time and the maximum wait time define a time window; and to transmit the setup response message to the base station.

15. The network node of claim 14, wherein the processor is further configured to randomly select the minimum wait time.

16. The network node of claim 14, wherein the processor is further configured to determine the minimum wait time based, at least in part, on a number of setup requests that have been received by the network node in a time interval.

17. The network node of claim 14, wherein the setup request message is an S1 setup request message.

18. The network node of claim14, wherein the network node is a mobile management entity.

19. A base station, comprising:
   a processor;
   a transmitter coupled to the processor for transmitting data to a network node;
   a receiver coupled to the processor for receiving data transmitted by the network node; and
   a data storage device coupled to the processor and containing computer instructions, the computer instructions comprising:
   instructions for waiting at least a certain amount of time before attempting to establish a connection with the network node; and
   instructions for attempting to establish the connection;
   wherein the computer instructions further include instructions for processing a setup response message transmitted from the network node, said instructions for processing including instructions for determining a first amount of time and a second amount of time based on information included in the setup response message, wherein the first amount time and the second amount of time define a window of time and the base station is configured to execute the instructions for attempting to establish the connection only at a point of time within the window of time.

20. The base station of claim 19, wherein the instructions for attempting to establish the connection comprise instructions for transmitting a message to the network node.

21. The base station of claim 19, wherein the computer instructions further include instructions for processing the setup response message transmitted from the network node, said instructions for processing including instructions for determining the certain amount of time based on information included in the setup response message.

22. The base station of claim 19, wherein the computer instructions further include instructions for randomly selecting a time within the defined window of time.

23. The base station of claim 19, wherein the network node is a mobile management entity.

24. The base station of claim 19, wherein the base station is an eNodeB.

* * * * *